US006529886B1

(12) United States Patent
Campana et al.

(10) Patent No.: US 6,529,886 B1
(45) Date of Patent: Mar. 4, 2003

(54) AUTHENTICATING METHOD FOR AN ACCESS AND/OR PAYMENT CONTROL SYSTEM

(75) Inventors: Mireille Campana, Clamart (FR); David Arditti, Clamart (FR); Henri Gilbert, Bures sur Yvette (FR); Thierry Leclercq, Paris (FR); Nicolas Bontron, Paris (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/331,184

(22) PCT Filed: Dec. 23, 1997

(86) PCT No.: PCT/FR97/02409

§ 371 (c)(1),
(2), (4) Date: Aug. 18, 1999

(87) PCT Pub. No.: WO98/28878

PCT Pub. Date: Jul. 2, 1998

(30) Foreign Application Priority Data

Dec. 24, 1996 (FR) .............................................. 96 15942

(51) Int. Cl.⁷ .............................................. G06F 17/60
(52) U.S. Cl. .......................................... 705/78; 705/74
(58) Field of Search ...................... 705/78, 74

(56) References Cited

U.S. PATENT DOCUMENTS

| | | | | |
|---|---|---|---|---|
| 4,731,840 A | * | 3/1988 | Miniszewski et al. | 380/21 |
| 5,355,413 A | * | 10/1994 | Ohno | 380/24 |
| 5,426,700 A | * | 6/1995 | Berson | 380/23 |
| 5,592,552 A | * | 1/1997 | Fiat | 380/21 |
| 5,602,915 A | * | 2/1997 | Campana et al. | 380/21 |
| 5,638,447 A | * | 6/1997 | Micali | 380/25 |
| 5,757,913 A | * | 5/1998 | Bellare et al. | 380/23 |
| 5,771,287 A | * | 6/1998 | Gilley et al. | 380/4 |
| 5,793,866 A | * | 8/1998 | Brown et al. | 380/2 |
| 5,999,711 A | * | 12/1999 | Misra | 395/187.01 |

FOREIGN PATENT DOCUMENTS

| | | |
|---|---|---|
| EP | 0 414 314 | 2/1991 |
| EP | 0613073 | 8/1994 |
| FR | 2 745 965 | 9/1997 |
| GB | 2267769 | * 12/1993 |
| GB | 2 294 795 | 5/1996 |
| WO | WO 96/13920 | 5/1996 |

OTHER PUBLICATIONS

Dialog (file 621, Accession No. 01069016)*
"Identix Introduces Advanced User Authentication System for Data Access Control", Mar. 28, 1988.*
P. Janson, et al., Computer Networks and ISDN Systems, XP–000228961, vol. 22, no. 5, pp. 323–345, "Security in Open Networks and Distributed Systems", Oct. 21, 1991.
D. Chaum, et al., Lecture Notes in Computer Science, Advances in Cryptology–CRYPTO '88, pp. 319–327, "Untraceable Electronic Cash", 1988.

* cited by examiner

Primary Examiner—James P. Trammell
Assistant Examiner—Jalatee Worjloh
(74) Attorney, Agent, or Firm—Oblon, Spivak, McClelland, Maier & Neustadt, P.C.

(57) ABSTRACT

This invention relates to an authentication process with an access control and/or payment system that maintains anonymity of the customer towards a third party, characterized in that a single-directional authentication protocol is used to send an authentication sequence that is completely different for each transaction, so that it is impossible for a third party to determine the identity of this customer, or even to determine which transactions are sent by a particular customer.

26 Claims, 1 Drawing Sheet

AUTHENTICATING METHOD FOR AN ACCESS AND/OR PAYMENT CONTROL SYSTEM

TECHNICAL DOMAIN

This invention relates to an authentication process with an access control and/or payment system for voice or information services offered by a service provider, who may or may not be a telecommunications operator.

The reference configuration illustrated in the figure shows a conventional device related to:

1°) client equipment (telephone or IT terminal);
2°) service provider equipment (for example order point for operator network services, voice server, Internet server belonging to a service provider, etc.);
3°) an access control and/or payment server.

This reference configuration is applicable to exchanges considered throughout the rest of this description. Functions 2°) and 3°) may or may not be related to the same operator/service provider.

In this type of device, a transaction involving access control and/or payment takes place as follows:

(I) A communication is set up between the client and the service provider.
(II) The service provider checks the customer's access rights and/or whether or not there is a useable account (customer account to be invoiced or prepaid account), with the access and/or payment server; possibly to obtain further data such as the maximum credit for the account considered.
(III) The service is provided.
(IV) The service provider may or may not send charging data to the access control and/or payment server.

The following security requirements have been identified for this type of transaction:

Customer Anonymity Towards Third Parties

In this case, a third party means:

1°) Any person who could access exchanges between the customer and the service provider. It must be impossible to use identification and authentication data transmitted during these exchanges to determine the customer's identity or even to determine what communications relate to a particular customer.
2°) The service provider itself, if it does not perform the access control and/or billing control function. If these functions are separate, it may be necessary to prevent the service provider from determining the identity of customers, or even preparing statistics based on grouping of transactions for a particular customer. In this case the identity of the customer (or the account used), which is essential for the access control and/or the payment for the service, must not be available to the service provider, either in plain text or in the form of a static pseudonym.

Customer Identity Authentication During Phase (II)

This authentication ensures that the customer, whose customer number and account number are given in the identification data transmitted to the control system (through the service provider), has actually set a communication with the service provider. An active authentication is essential in order to prevent frauds by replaying old data.

Furthermore, an additional security service may also be offered optionally:

Customer Data Authentication

For example, the access control and/or the payment server can use this function to make sure that the customer accepts the amount of the service in the case in which the data on which the authentication is calculated represent this amount.

State of Prior Art

At the present time, most devices with secret keys performing an authentication use an "identification-authentication" type scheme (typically name+password) and consequently there is no anonymity.

Devices guaranteeing anonymity at the same time as legal access to a resource are rare and are systematically based on the use of a public key, as described in article reference [1] at the end of the description, but this implies fairly long exchanges (at least 512 bits). However, the customer may only have a telephone and may be put into contact with a human operator or a voice or non-voice server at the service provider. The customer may also have a microcomputer without a modem. In this case, it is impossible to ask him to type an excessively long sequence of characters on his keyboard, or to say it orally.

In the process according to the invention, due to strong constraints on the length of the identification-authentication type scheme (typically name+password) and consequently there is no anonymity.

Devices guaranteeing anonymity at the same time as legal access to a resource are rare and are systematically based on the use of a public key, as described in article reference [1] at the end of the description, but this implies fairly long exchanges (at least 512 bits). However, the customer may only have a telephone and may be put into contact with a human operator or a voice or non-voice server at the service provider. The customer may also have a microcomputer without a modem. In this case, it is impossible to ask him to type an excessively long sequence of characters on his keyboard, or to say it orally.

In the process according to the invention, due to strong constraints on the length of the identification-authentication message, the use of an authentication method using a public key (which would result in messages more than 100 digits long) is unthinkable. Furthermore, it is impossible to use the conventional technique for authentication of a random number emitted by the network, which would require a two-directional exchange.

The purpose of the invention is an authentication process that can solve the problems described above. Document reference [2] describes a method and a device enabling identification of a mobile user in a communication network. This method consists of encrypting the user's identifier and/or his password and a synchronization indication, preferably over a fixed time interval, by using a secret single-directional function and sending the encrypted message called the "dynamic user identifier" to a user center in which it is recorded. This method ensures that the user remains anonymous towards third parties; third parties are incapable of identifying the user or following his movements. This method enables a user who moves from a home area to another area to inform the user center for this area and his home area center.

Document reference [3] describes various methods of protecting information, objects and other resources located in networks and in distributed systems. In particular, this document describes single directional authentication methods. In one of these methods, an electronic card issued to a user periodically generates a new random number by encrypting a real time clock read with a secret key hidden inside the card. The resulting random number is then used as a "single use" password. A host computer which has a copy of the secret key on each user card can perform the same encryption to verify the random numbers that it receives. These cards can send a "challenge" word such as {user name, password, date, time} to the host computer, encrypted with a built up secret key shared with the computer.

DESCRIPTION OF THE INVENTION

This invention relates to an authentication system with an access control and/or payment system that maintains anonymity towards a third party, characterized in that an authentication sequence that is completely different in each transaction is transmitted using a single directional authentication protocol, such that it is impossible for a third party to determine the identity of the customer, or even to determine which transactions are sent by the same customer.

Advantageously, a counter in the customer's authenticator incremented by one unit at each authentication attempt is used, the authentication data transmitted during each access being the current value C of the customer's counter and an authentication code CA with d digits, calculated starting from the customer's secret authentication key $K_{customer}$ and the counter C using an authentication algorithm A, the code CA being given by the following relation:

$$CA = A(K_{customer}, C)$$

If the customer would like to "sign" the data M, the parameter M also appears in the authentication calculation, the authentication code CA being given by the relation:

$$CA = A(K_{customer}, C||M).$$

In the access control and/or payment server, the value of the counter corresponding to the last successful authentication, C', is kept for each customer.

The access control and/or payment server is capable of rebuilding the secret authentication key $K_{customer}$ for each customer.

Advantageously, this key may be rebuilt starting from a master authentication key KA common to the entire system and from the customer's identity, using an algorithm called the diversification algorithm and denoted D where:

$$K_{customer} = D(KA, ID[customer]).$$

Advantageously, an authentication attempt is only accepted if the value of the counter C for the customer considered is greater than C' by one to several tens of units and if the authentication value CA which accompanies it is equal to the authentication value recalculated by the server using C and the key $K_{customer}$.

Advantageously, in order to maintain anonymity of the customer's identity with regard to the service provider, this identity is encrypted using a key shared between the customer's authenticator and the access control and/or payment server.

Clients can optionally be distributed into groups, and a separate encryption key can be used for each group.

In a first variant of the invention, not based on the use of group numbers, the customer transmits the following during each access:

his individual identification number NI encrypted with the system encryption key K, using the authentication value CA as initialization vector;

authentication data CA and a short representation of the value of the counter C (which for example may be composed of the two low order digits of C), denoted c. Advantageously, c may be encrypted using the key K, and using the authentication value CA as an initialization vector.

In a second variant based on the use of group numbers, the customer transmits the following during each access:

the group number to which he belongs, NG, in plain text;

his individual identification number within the group, NI, encrypted with the encryption key $K_{NG}$ for the group NG using the authentication value CA as initialization vector. The complete identity of a customer is given by the pair (NG, NI);

authentication data CA and a short representation of the value of the counter C (which for example may be composed of the two low order digits of C) denoted c. Advantageously, c may be encrypted using the key $K_{NG}$, and using the value of CA as an initialization vector.

In a third variant, the group number NG is also encrypted using an encryption key K common to the entire system.

In order to facilitate management of group keys in the access control and/or payment server, all keys in group $K_{NG}$ may depend on the same master key KE through a diversification algorithm:

$$K_{NG} = D(KE, NG)$$

The algorithm for encryption of NI and C using key $K_{NG}$ is denoted E, the encryption algorithm for NG using key K is denoted E', the concatenation of two decimal (or binary or hexadecimal, etc.) strings A and B is denoted A||B, and the identification-authentication message is then created by concatenating the following elements:

the encrypted value $E'_{K,CA}(NG)$ of the group number;

the authentication code CA;

the encrypted value $E_{K_{NG},CA}(c||NI)$, where c is a short representation of the value of the counter C (for example c is composed of the two low order digits of counter C);

the identification-authentication sequence is given by the following string:

$$E'_{K,CA}(NG)||E_{K_{NG},CA}C||NI)||CA.$$

BRIEF DESCRIPTION OF THE FIGURES

The FIGURE shows a conventional device related to equipment belonging to a customer, a service provider and an access control and/or payment server.

DETAILED DESCRIPTION OF EMBODIMENTS

Figure 1:
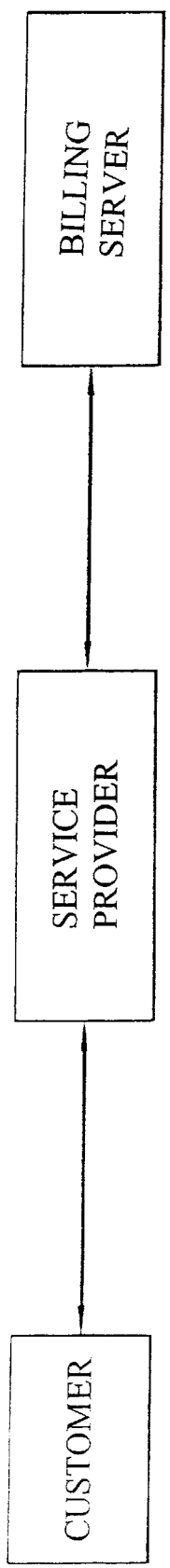

In the device illustrated in the FIGURE, in order to ensure that customer-network exchanges transporting identification and authentication data performed during phase (I) defined above can be made from all types of terminals, and particularly from a telephone handset, the access control and/or payment system is such that:

the identification-authentication exchange on the customer-supplier segment is single-directional and consists simply of sending a single message sent by the customer;

the identification-authentication message is advantageously encoded in decimal (for example so that it can be transmitted in DTMF (frequency multiplication starting from two sounds) or dictated vocally from a telephone handset, its length not exceeding about fifteen digits for convenience reasons.

Cryptographic authentication and encryption calculations are carried out in protected devices offering sufficient protection for the keys used. A physically protected security module is advantageously used for the access control and/or payment server. There are three possible layout options for a customer security device, hereinafter called the authenticator:

a personal authenticator may be issued to the customer, fairly similar to a pocket calculator, the operation of the authenticator depending on a personal code being checked locally;

software may be installed on a microcomputer, the keys then being stored encrypted outside the software;

IT server supplying authentication sequences to a customer.

In the process according to the invention, the authentication sequence sent by the customer (or his authenticator) is varied by applying an authentication algorithm to a number, and the access control and/or payment server simply verifies that this number changes in each transaction.

A counter may be used in the customer authenticator, which is incremented by one unit each time that an authentication attempt is made. Authentication data transmitted during each access are equal to the current value C of the customer counter and an authentication code CA with d digits calculated starting from the secret customer authentication key, $K_{customer}$, and the counter C, by means of an authentication algorithm A.

If the client would like to establish his identity with the access control and/or payment server, and also to "sign" M data, then the parameter M is also used in the authentication calculation.

We thus have:

in the case of a pure authentication, the code CA given by the relation:

$$CA=A(K_{customer}, C);$$

in the case in which the customer also needs to authenticate data, the authentication code CA given by the relation:

$$CA=A(K_{customer}, C||M)$$

If the authentication algorithm A is well designed, a defrauder who observed customer exchanges will be unable to predict the authentication code corresponding to a new value of C (or any (C, M) pair) with a probability greater than $10^{-d}$.

The counter value corresponding to the last successful authentication C' in the access control and/or payment server is kept for each customer. Furthermore, if the diversification method mentioned above is used, the access control and/or payment server will be capable of rebuilding the secret authentication key $K_{customer}$ for each customer, starting from a master authentication key KA common to the entire system and the customer identity, using a "diversification" algorithm denoted D:

$$K_{customer}=D(KA, ID[customer]).$$

An authentication attempt will only be accepted if the counter value C for the customer considered is greater than C' by one or several tens of units and if the authentication value CA that accompanies it is equal to the authentication value recalculated by the server starting from C and the key $K_{customer}$.

In the case of a multi-user authenticator, it may be difficult to guarantee that users use their connection tickets in the exact order in which they were issued. In this case, an authentication data verification procedure may be carried out so that slight changes in the sequences of the value of C can be accepted.

In order to ensure that the customer's identity remains anonymous to the service provider, this identity is encrypted using a key shared by the customer authenticator and the access control and/or payment server (encryption with secret key).

This key cannot be specific to each customer: the access control and/or payment server would need to receive the identity or a pseudonym of the customer in plain text in order to find it and decrypt it, which is exactly what we are trying to avoid. But conversely, the use of a single encryption key for the entire system located in security modules belonging to all users would not be very reliable.

Customers can then be broken down into groups and a separate encryption key can be used for each group. The size of the group must be sufficiently large so that knowledge of the group to which a customer belongs only provides a small clue towards his identity, and the number of groups must be sufficiently large so that the consequences of the encryption key common to the group becoming known will have limited consequences (loss of anonymity for one group).

In a first variant of the invention not based on the use of group numbers, the customer transmits the following during each access:

his individual identification number NI encrypted with a system encryption key K using the authentication value CA as an initialization vector;

authentication data CA and a brief representation of the value of the counter C (which for example may consist of the two low order digits of C) denoted c. Advantageously, c may be encrypted using the key K, using the authentication value CA as the initialization vector.

In a second variant based on the use of group numbers, the customer transmits the following during each access:

the group number (NG) to which he belongs, in plain text;

his individual identification number within the group (NI, three digits) encrypted with the encryption key $K_{NG}$ of group NG, using the authentication value CA as the initialization vector. The complete identity of a customer is given by the (NG, NI) pair;

the authentication data (CA and C): it is decided not to encrypt CA; however, C is encrypted using the key $K_{NG}$.

The above solution can be improved slightly if the group number NG is also encrypted using an encryption key K common to the entire system, instead of transmitting it in plain text. This thus gives a third variant.

In order to facilitate the management of group keys in the access control and/or payment server, all keys in the group $K_{NG}$ may be made to depend on the same master key KE, through a diversification algorithm:

$$K_{NG}=D(KE, NG).$$

The encryption algorithm for NI and C using the key $K_{NG}$ is denoted E, and the encryption algorithm for NG using key K is denoted E'.

Concatenation of two decimal (or binary, or hexadecimal) strings A and B is denoted A||B, and the identification-authentication message is made up by concatenating the following elements:

the encrypted value $E'_{K,CA}(NG)$ of the group number (variable length, greater than or equal to 1);

the authentication code CA in plain text;

the encrypted value $E_{KNG,CA}(C\|NI)$ where c is a short representation of the value of the counter C (for example c may be composed of the two low order digits of the counter C).

The identification-authentication sequence is thus given by a string:

$$E'_{K,CA}(NG)\|E_{KNG,CA}(C\|NI)\|CA.$$

REFERENCES

[1] Article by D. Chaum entitled "Untraceable Electronic Cash, Advances in Cryptology" (Crypto 88, Springer Verlarg 1990, pages 319–327).

[2] WO-A-96 13920

[3] "Security in Open Networks and Distributed Systems" by JANSON P et al (Computer networks and ISDN systems, Oct. 21 1991, Netherlands, Vol. 22, No. 5, ISSN 0169-7552, pages 323–346, XP000228961).

What is claimed is:

1. Authentication process of a customer with an access control and/or payment system of voice or IT services offered by a service provider that maintains anonymity of the customer towards third parties, wherein a transaction involving the access control and/or payment system comprises:

(I) a communication, wherein an identification-authentication message is single-directional and includes sending an identification-authentication sequence varying by applying an authentication algorithm to a number which is different for each transaction set up between the customer and the service provider;

(II) the service provider checks access rights of the customer and/or whether there is a useable account for the customer, with the access and/or payment system; and (III) when the customer has access rights and/or a useable account, providing service from the service provider.

2. Process according to claim 1, wherein the identification-authentication sequence comprises a short representation of a value of a customer counter.

3. Process according to claim 2, wherein the short representation of the value of the customer counter is encrypted using an encryption key.

4. Process according to claim 3, wherein the customer transmits the following during each access:

NG, a number of a group to which the customer belongs, in plain text;

NI, an individual identification number for the customer within the group encrypted with $K_{NG}$, a group encryption key for the group;

authentication data; and the short representation of the value of the customer counter.

5. Process according to claim 4, wherein the short representation of the value of the customer counter is encrypted using the group encryption key.

6. Process according to claim 4, wherein the number of the group is encrypted using the encryption key.

7. Process according to claim 6, wherein all keys in the group encryption key depend on a same master key through an algorithm D such that: $K_{NG}$=D (KE, NG), where KE is the master key and NG is the number of the group.

8. Process according to claim 4, wherein an encryption algorithm for the individual identification number and the short representation of the value of the customer counter using the group encryption key is denoted E, the encryption algorithm for the group number using the encryption key is denoted E', a concatenation of the two strings A and B is denoted A∥B, and the identification-authentication sequence is then defined by the string:

$$E'_{K,CA}(NG)\|E_{KNG,CA}C\|NI\|CA.$$

9. Process according to claim 1, wherein a customer authenticator comprises a counter that is incremented by one unit during each authentication attempt.

10. Process according to claim 1, wherein an authentication code is given by the relation CA=A ($K_{customer}$, C∥M) if the customer wants to sign his data, where $K_{customer}$ is a secret authentication key for the customer, C is the value of the customer counter, and M is the data.

11. Process according to claim 1, wherein a value of the customer counter corresponding to a last successful authentication is kept in the access control and/or payment system, for each customer, and in that said system rebuilds the secret authentication key for each customer starting from a master authentication key common to the entire system and the identity of the customer, using an algorithm denoted D, where: $K_{customer}$=D(KA, ID[customer]), KA is the master authentication key, and ID[customer] is the identity of the customer.

12. Process according to claim 11, wherein an authentication attempt is only accepted if the value of the customer counter for the customer considered is greater than the value of the customer counter corresponding to the last successful authentication by at least one unit and if the authentication value that accompanies it is equal to the authentication value recalculated by the system using the values of the customer counter and the customer authentication key.

13. Process according to claim 1, wherein customers are distributed into groups and a separate encryption key is used for each group.

14. An authentication method for a customer with at least one of an access control and payment system on at least one of voice and IT services offered by a service provider that maintains anonymity of the customer towards third parties, wherein a transaction involving at least one of the access control and payment system comprises:

communicating an identification-authentication message that is single-directional and further includes:

sending an identification-authentication sequence that is varied by applying an authentication algorithm to a number that is different for each transaction, and setting up said identification-authentication sequence between the customer and the service provider;

checking access rights of the customer and whether the customer has a useable account with at least one of the access control and payment system; and providing service from the service provider when the customer has access rights and a useable account.

15. The method according to claim 14, wherein the identification-authentication sequence comprises a short representation of a value of a customer counter.

16. The method according to claim 15, wherein the short representation of the value of the customer counter is encrypted using an encryption key.

17. The method according to claim 16, wherein the customer transmits the following during each access:

NG, a number of a group to which the customer belongs, in plain text;

NI, an individual identification number for the customer within the group encrypted with $K_{NG}$, a group encryption key for the group;

authentication data; and the short representation of the value of the customer counter.

18. The method according to claim 17, wherein the short representation of the value of the customer counter is encrypted using the group encryption key.

19. The method according to claim 17, wherein the number of the group is encrypted using the encryption key.

20. The method according to claim 17, wherein all keys in the group encryption key depend on a same master key through an algorithm D such that: $K_{NG}=D(KE, NG)$, where KE is the master key and NG is the number of the group.

21. The method according to claim 17, wherein an encryption algorithm for the individual identification number and the short representation of the value of the customer counter using the group encryption key is denoted E, the encryption algorithm for the group number using the encryption key is denoted E', a concatenation of the two strings A and B is denoted A∥B, and the identification-authentication sequence is then defined by the string:

$$E'_{K,CA}(NG)\|E_{K_{NG},CA}C\|NI)\|CA.$$

22. The method according to claim 14, wherein a customer authenticator comprises a counter that is incremented by one unit during each authentication attempt.

23. The method according to claim 14, wherein an authentication code is given by the relation $CA=A(K_{customer}, C\|M)$ if the customer wants to sign his data, where $K_{customer}$ is a secret authentication key for the customer, C is the value of the customer counter, and M is the data.

24. The method according to claim 14, wherein a value of the customer counter corresponding to a last successful authentication is kept in at least one of the access control and payment system, for each customer, and in that said system rebuilds the secret authentication key for each customer starting from a master authentication key common to the entire system and the identity of the customer, using an algorithm denoted D, where: $K_{customer}=D(KA, ID)$, KA is the master authentication key, and ID is the identity of the customer.

25. The method according to claim 24, wherein an authentication attempt is only accepted if the value of the customer counter for the customer considered is greater than the value of the customer counter corresponding to the last successful authentication by at least one unit and if the authentication value that accompanies it is equal to the authentication value recalculated by the system using the values of the customer counter and the customer authentication key.

26. The method according to claim 14, wherein customers are distributed into groups and a separate encryption key is used for each group.

* * * * *